US012118307B2

(12) United States Patent
Mamidela et al.

(10) Patent No.: US 12,118,307 B2
(45) Date of Patent: Oct. 15, 2024

(54) ENHANCED CHATBOT INTELLIGENCE

(71) Applicant: SAP SE, Walldorf (DE)

(72) Inventors: Dilip Mamidela, Bangalore (IN); Janaki Raam Vaidhyanathan, Krishnagiri (IN)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 17/746,349

(22) Filed: May 17, 2022

(65) Prior Publication Data

US 2023/0376686 A1    Nov. 23, 2023

(51) Int. Cl.
*G06F 40/279*    (2020.01)
*H04L 51/02*    (2022.01)

(52) U.S. Cl.
CPC ............ *G06F 40/279* (2020.01); *H04L 51/02* (2013.01)

(58) Field of Classification Search
CPC ...... G06F 3/167; G06F 11/0793; G06F 18/23; G06F 16/3326; G06F 40/279; G06F 40/268; G06F 40/295; G06F 40/30; G06F 40/35; G06F 16/248; G06F 16/353; G06F 16/90332; G06F 16/904; G06F 40/56; G06N 3/044; G06N 5/04; G06N 5/041; G06N 3/006; G06N 3/045; G06N 3/08; G06N 3/084; G06N 5/02; G06N 5/022; G06N 5/043; G06N 5/048; G06N 20/20; H04L 51/02; H04M 3/5166; H04M 3/5235; H04M 3/42382; G01C 21/3641; G06Q 10/1093; G06Q 30/0281; G06Q 30/0631; G06Q 30/0641; G06Q 40/12; G06T 19/006; G10L 13/08; G10L 13/10; G10L 15/01; G10L 15/28; G10L 17/04; H04N 7/157; H04W 4/14; H04W 76/10
See application file for complete search history.

(56) References Cited

U.S. PATENT DOCUMENTS

| | | | | |
|---|---|---|---|---|
| 9,431,003 | B1 * | 8/2016 | Cecchi | G10L 13/08 |
| 9,582,762 | B1 * | 2/2017 | Cosic | H04N 7/157 |
| 9,613,131 | B2 * | 4/2017 | Braham | G06F 16/3326 |
| 10,999,434 | B1 * | 5/2021 | Andar | G06N 5/04 |
| 11,663,255 | B2 * | 5/2023 | Joko | H04L 51/02 |
| | | | | 704/9 |
| 11,860,944 | B2 * | 1/2024 | Lee | G06F 16/90332 |
| 11,882,084 | B1 * | 1/2024 | Kalluri | H04L 51/02 |
| 2002/0042713 | A1 * | 4/2002 | Kim | G10L 15/28 |
| | | | | 704/E15.046 |

(Continued)

*Primary Examiner* — Gerald Gauthier
(74) *Attorney, Agent, or Firm* — Sterne, Kessler, Goldstein & Fox P.L.L.C.

(57) ABSTRACT

Various embodiments for a chatbot improvement system are described herein. An embodiment operates by receiving input from a user via a chatbot interface. A first vertical corresponding to the user is identified. The input from the user is interpreted based on a first set of keywords corresponding to the first vertical. A first confidence score is calculated for the first vertical based on the interpretation of the input using the first set of keywords. It is determined whether the first confidence score exceeds a threshold. If the threshold is exceeded, a response to the input is generated based on the first set of keywords. If the threshold is not exceeded, the response to the input based on the second set of keywords. The generated response is provided for display via the chatbot interface.

17 Claims, 3 Drawing Sheets

(56) References Cited

U.S. PATENT DOCUMENTS

| | | | | |
|---|---|---|---|---|
| 2002/0055894 | A1* | 5/2002 | Hyder | G06Q 40/12 709/224 |
| 2006/0041378 | A1* | 2/2006 | Cheng | G01C 21/3641 701/431 |
| 2009/0112586 | A1* | 4/2009 | Williams | G10L 15/01 704/E15.001 |
| 2014/0046891 | A1* | 2/2014 | Banas | G06N 5/022 706/46 |
| 2018/0096686 | A1* | 4/2018 | Borsutsky | G06F 3/167 |
| 2018/0307687 | A1* | 10/2018 | Natkin | G06F 16/248 |
| 2018/0331979 | A1* | 11/2018 | Rakovitsky | G06Q 30/0641 |
| 2018/0332447 | A1* | 11/2018 | Rakovitsky | H04W 4/14 |
| 2018/0341869 | A1* | 11/2018 | Baughman | G06N 5/043 |
| 2018/0365212 | A1* | 12/2018 | Banerjee | H04L 51/02 |
| 2019/0132264 | A1* | 5/2019 | Jafar Ali | G06F 40/295 |
| 2019/0147111 | A1* | 5/2019 | Choi | G06F 11/0793 704/9 |
| 2019/0207876 | A1* | 7/2019 | Terry | G06Q 10/1093 |
| 2019/0213659 | A1* | 7/2019 | Shannon | G06Q 30/0631 |
| 2019/0220773 | A1* | 7/2019 | Terry | G06N 5/02 |
| 2019/0220774 | A1* | 7/2019 | Terry | G06F 16/904 |
| 2019/0221133 | A1* | 7/2019 | Terry | G06N 5/048 |
| 2019/0286711 | A1* | 9/2019 | Terry | G06N 20/00 |
| 2019/0286712 | A1* | 9/2019 | Terry | H04L 51/02 |
| 2019/0286713 | A1* | 9/2019 | Terry | G06F 40/56 |
| 2019/0370629 | A1* | 12/2019 | Liu | G06N 5/041 |
| 2020/0034797 | A1* | 1/2020 | Jonnalagadda | H04L 51/02 |
| 2020/0143115 | A1* | 5/2020 | Brigham | G06N 3/006 |
| 2020/0143247 | A1* | 5/2020 | Jonnalagadda | G06N 3/044 |
| 2020/0143265 | A1* | 5/2020 | Jonnalagadda | G06N 3/045 |
| 2020/0201913 | A1* | 6/2020 | Terry | G06Q 30/0281 |
| 2020/0226475 | A1* | 7/2020 | Ma | G06F 40/30 |
| 2020/0286018 | A1* | 9/2020 | Chan | H04L 51/02 |
| 2020/0334568 | A1* | 10/2020 | Liden | H04M 3/42382 |
| 2020/0342850 | A1* | 10/2020 | Vishnoi | G06F 40/30 |
| 2020/0372055 | A1* | 11/2020 | Joko | G06F 40/268 |
| 2021/0067470 | A1* | 3/2021 | Freed | G06F 18/23 |
| 2021/0144107 | A1* | 5/2021 | Liang | G06N 5/04 |
| 2021/0176282 | A1* | 6/2021 | Filar | G06F 40/295 |
| 2021/0326369 | A1* | 10/2021 | Roitman | G06F 16/353 |
| 2021/0360109 | A1* | 11/2021 | Rico Ródenas | H04M 3/5235 |
| 2021/0382925 | A1* | 12/2021 | Fincun | G06F 40/35 |
| 2021/0385886 | A1* | 12/2021 | Lo | H04W 76/10 |
| 2022/0050968 | A1* | 2/2022 | Xie | H04L 51/02 |
| 2022/0084526 | A1* | 3/2022 | Freed | G10L 17/04 |
| 2022/0171946 | A1* | 6/2022 | Xu | G06F 40/35 |
| 2022/0232126 | A1* | 7/2022 | Naidu | H04M 3/5166 |
| 2022/0247699 | A1* | 8/2022 | Gupta | H04L 51/02 |
| 2022/0247700 | A1* | 8/2022 | Bhardwaj | G06N 3/044 |
| 2022/0270594 | A1* | 8/2022 | Sejpal | G06N 3/045 |
| 2022/0400159 | A1* | 12/2022 | Chi | G06N 3/084 |
| 2023/0005360 | A1* | 1/2023 | Zhou | G06N 20/20 |
| 2023/0177582 | A1* | 6/2023 | Dwivedi | G06Q 30/0641 705/26.7 |
| 2023/0252242 | A1* | 8/2023 | Aubineau | G06F 40/35 704/9 |
| 2023/0351711 | A1* | 11/2023 | Roach | G06T 19/006 |
| 2023/0352001 | A1* | 11/2023 | Carmiel | G10L 13/10 |
| 2023/0376686 | A1* | 11/2023 | Mamidela | G06F 40/35 |

* cited by examiner

ENHANCED CHATBOT INTELLIGENCE

BACKGROUND

Chatbots are software applications that are used to conduct conversations with users, often prior to or in lieu of using a human agent to conduct those conversations. The effectiveness of a chatbot is based on a number of different factors, at the very core of which is the ability of the chatbot to understand what the user is requesting through the chatbot. If a chatbot is unable to understand what the user is requesting, then its effectiveness and utility are greatly diminished.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Chatbots are software applications that are used to conduct conversations with users, often prior to or in lieu of using a human agent to conduct those conversations. The effectiveness of a chatbot is based on a number of different factors, at the very core of which is the ability of the chatbot to understand what the user is requesting through the chatbot. If a chatbot is unable to understand what the user is requesting, then its effectiveness and utility are greatly diminished.

Figure 1:
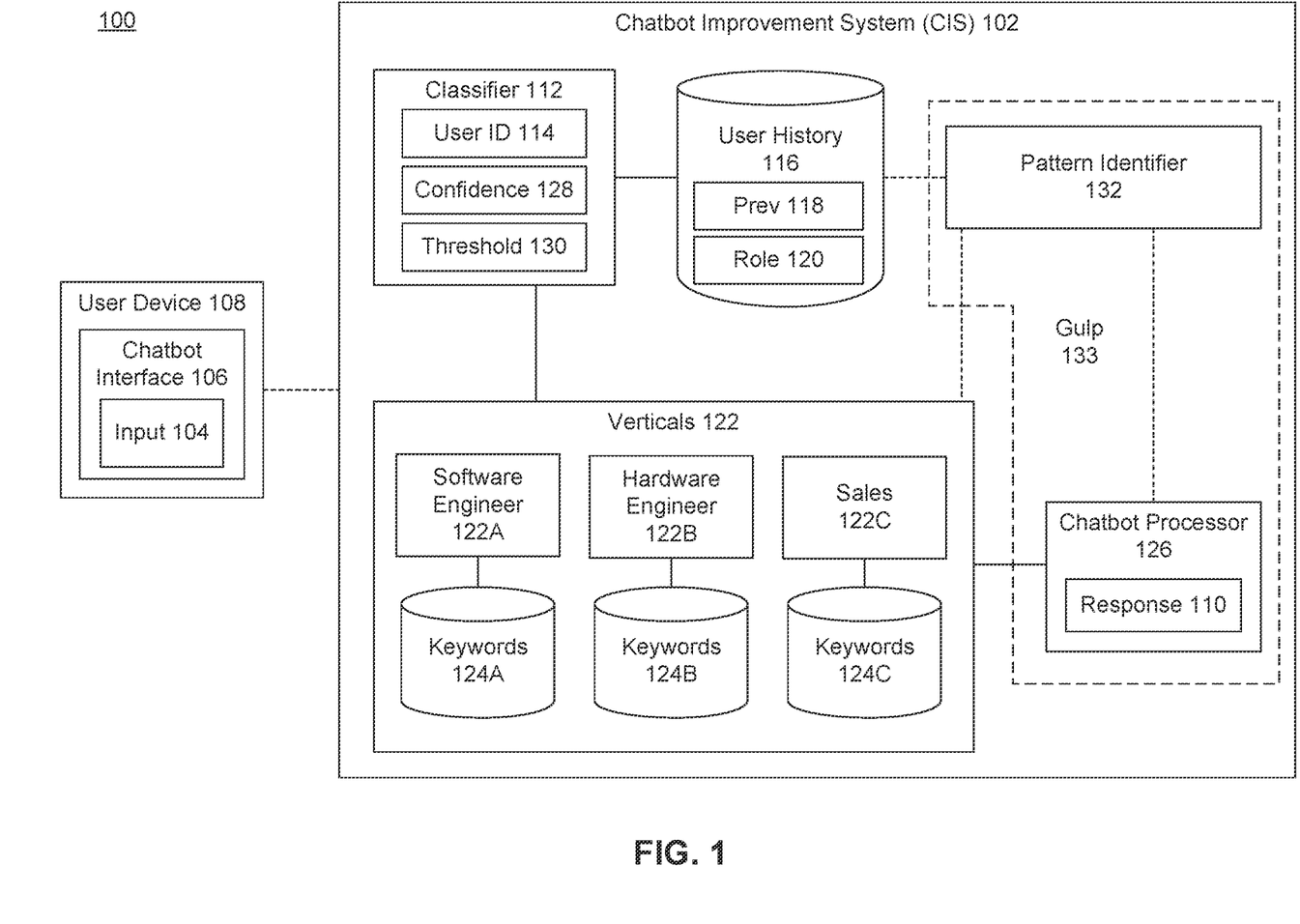
FIG. 1 illustrates a block diagram of a chatbot improvement system (CIS) for providing enhanced chatbot intelligence, according to some example embodiments.

FIG. 1 illustrates a block diagram 100 of a chatbot improvement system (CIS) 102 for providing enhanced chatbot intelligence, according to some example embodiments. In some embodiments, CIS 102 may improve the accuracy and responsiveness of a chatbot in interpreting and responding to requests or other input provided by a user, while also reducing the processing required to generate a response to the input or an inquiry from the user.

In some embodiments, CIS 102 may receive input 104 via a chatbot interface 106 accessible via a user device 108. User device 108 may include any computing device that a user is using to access chatbot interface 106, and may include, but is not limited to, a mobile phone, laptop, desktop, or other Internet of Things (IoT) or Smart computing device.

Chatbot interface 106 may include any interface that enables a user to access chatbot functionality or interact with a chatbot. In some embodiments, chatbot interface 106 may be accessible via the internet (e.g., through a website), a messaging application (including textual and/or audio communications), or any add on messaging service that enables two-way communications. Chatbot interface 106 may allow a user to speak and/or type input 104, and allow the chatbot (e.g., via CIS 102) to provide a response 110 (in audio, text, or multimedia, including hyperlinks).

The initial input 104, provided by a user through chatbot interface 106, may be received by a classifier 112 of CIS 102. Classifier 112 may identify a user ID 114. User ID 114 may be a username, name, telephone number, internet protocol (IP) address, media access control (MAC) address, or other identifier of user device 108 and/or a user of user device 108. Classifier 112 may retrieve a user history 116 based on the user ID 114.

User history 116 may include any information about the corresponding userID 114, including but not limited to information about one or more previous interactions with chatbot interface 106 (stored as Prev 118) and a role 120 of a user. This user history 116 information may be used to identify a vertical 122A-C (e.g., from verticals 122) under which to interpret the initial and any subsequent user input 104.

Verticals 122 may include a set of groups or categories in view of which to interpret user input 104 and generate one or more responses 110. Each category or vertical 122A-C may include specialized or targeted set of information and/or logic that may be used to perform natural language processing (NLP) on input 104 and generate a response 110. In some embodiments, different verticals 122A-C may have access to different database tables normally associated with each particular vertical 122A-C. Several example verticals 122 are illustrated: software engineer 122A, hardware engineer 122B, sales 122C. In other embodiments, different categories of verticals 122 may be used.

In some embodiments, the various verticals 122 may updated, added, or removed over time based on detected changes in the various terminology or requests used in input 104. For example, a pattern identifier 132 may use artificial intelligence (AI) or machine learning to cluster inputs 104 across users, and may update the categories or verticals 122 as new input clusters are formed. In some embodiments, pattern identifier 132 and chatbot processor 126 may work together as a GULP system 133 that may be configured to gradually understand and learn patterns ("GULP"). In some embodiments, the GULP system may generate and test patterns based on input 104 and desired responses 110, as well as any patterns therein corresponding to user intent.

In some embodiments, each vertical 122A-C may have its own set of keywords 124A-C. Keywords 124A-C may include a set of syntax or grammar, formulas, words, and/or phrases, that are commonly or likely to be used within that specific vertical 122A-C. In some embodiments, the keywords 124A-C may correspond to historically popular or known requests from users, phrases or input 104 received by one or more users, or retrieved from data dictionaries, websites, books, manuals, or any other specialized data source(s).

A chatbot processor 126 may use a selected vertical 122A-C (and its corresponding keywords 124A-C) to process, understand, or interpret input 104. Chatbot processor 126 may identify what is the user requesting through input 104 and may generate a specific response 110 to the input 104, based on the vertical 122A-C that was selected by classifier 112. In some embodiments, the CIS 102 may change which vertical 122A-C is selected to process input 104 and generate a response 110 during the same computing or chatbot session with a user or user device 108.

The response 110 may be provided back to the user device 108 through chatbot interface 106. In some embodiments, the response 110 may include providing the requested information or performing a requested action or command. In some embodiments, response 110 may include a request from chatbot processor 126 for additional information from a user (via chatbot interface 106) which may be used to either perform the user requested action received via input 104 and/or confirm/switch or the selected vertical 122A-C.

As indicated above, prev 118 includes information about one or more previous interactions between a user ID 114 and chatbot interface 106. During each of those previous interactions, one or more verticals 122A-C were selected for chatbot processor 126 to use to generate responses 110 to the user input 104 during those previous sessions. In some embodiments, prev 118 or user history 116 may only be visible or accessible to classifier 112 during an active session the user or user device corresponding to the user history 116, thus increasing the security of user history 116.

In some embodiments, classifier 112 may use prev 118 to determine an initial selection of a vertical 122A-C. For example, classifier 112 may select the most recently selected or used vertical for the selected vertical 122A-C for the new/current session with user device 108. In some embodiments, classifier 112 may select the vertical that was used most commonly in user history 116, over some specific time period (e.g., the previous 3 months or 1 year). Chatbot processor 126 may use this initially selected vertical 122, to interpret an initial input 104 received from user device 108. In some embodiments, CIS 102 may include a timeout period during which the currently selected vertical 122 may be reset after a threshold period of time (e.g., 180 seconds) and a new vertical 122 may be selected or established based on subsequent inputs 104.

In some embodiments, a user ID 114 may be associated with a role 120. Role 120 may indicate a title or department of a user associated with the user ID 114. In some embodiments, different roles 120 may each have or correspond to a default vertical 122A-C that is used to process at least initial input(s) 104 from a user ID 114 associated with that role 120. For example, if the role 120 is salesman, then the initial or default vertical may be sales 122C. The presumption being, most input from a salesman role 120 will be about sales-related information with sales-related requests.

As indicated above, the sales 112C vertical may provide CIS 102 access to particular tables from a database, or load sales-related hot data into memory for faster processing. For example, there may be frequently asked questions or frequently received sales requests from a particular user ID 114, or across user IDs 114 in the sales vertical 122C. In some embodiments, the data that is often used to process those sales related requests or inquiries may be loaded into memory based on a selection of the sales vertical 122C.

In some embodiments, the default or initial vertical may be selected based on prev 118, role 120, or both. If both are being used, and if there is a discrepancy between the vertical 122 of role 120 and the vertical 122 that would be selected based on prev 118, then in one embodiment, the vertical of prev 118 may be selected, while the vertical of role 120 may be designated a secondary vertical (in case a switch is necessary as discussed in greater detail below). In another embodiment, the vertical of role 120 may be selected as the initial vertical for the current session with a user device 108 through chatbot interface 106, and the vertical of prev 118 may be designated as the secondary vertical 122.

In some embodiments, classifier 112 may generate or retrieve a confidence score 128 based on chatbot processor 126 performing NLP (natural language processing) on input 104 using the keywords 124A-C in view of the selected vertical 122A-C. Confidence 128 may be a numerical (or alphabetical) indicator of a level of confidence that chatbot processor 126 has that it has correctly or logically interpreted the input 104. In some embodiments, the confidence score 128 may be based on how well the input 104 coordinates to a specified formula or syntax for likely input for the selected vertical 122, or how many of the words of input 104 correspond to the keywords 124A-C of the selected vertical 122.

In some embodiments, classifier 112 may check confidence 128 of input 104 against a threshold 130. If confidence 128 is greater than threshold 130, then the selected vertical 122 may continue to be used to process the present and subsequent inputs 104 from the user device 108 through the chatbot interface 106.

If confidence 128 is less than threshold 130, then classifier 112 may select a second, secondary, or different vertical against which to cause or message chatbot processor 126 to interpret input 104. In some embodiments, the second vertical may be selected from user history 116 (e.g., as the second most recently or second most commonly used vertical). Or, for example, role 120 may have a primary and secondary vertical associated with it as described above.

Or, as noted above, if a secondary vertical 122 has been designated, this may be the second vertical against with the input 104 and corresponding confidence 128 is tested. If the confidence 128 of the secondary vertical exceeds the threshold 130, then the secondary vertical may be selected without further testing. In some embodiments, classifier 112 may test input 104 against all the other verticals 122B-C and select the vertical with the highest confidence 128 (regardless of whether threshold 130 is exceeded or not).

Chatbot processor 126 may continue to process subsequent inputs 104 and generate responses 110 based on whatever vertical 122A-C has been most recently selected. Meanwhile, classifier 112 may continuously, in parallel, or periodically check the confidence 128 of inputs 104 against threshold 130, and if confidence 128 drops below threshold 130, classifier 112 may select a new vertical 122A-C, mid-session, seamlessly behind the scenes until confidence 128 exceeds threshold 130, or the vertical 122A-C with the highest confidence 128 is selected. The one or more selected verticals 122 may be stored in user history 116.

In some embodiments, CIS 102 may notify a user through chatbot interface 106 about which vertical 122 has been selected, and/or when a new vertical is selected mid-session. In some embodiments, input 104 may include a user selection of a particular vertical 122 from chatbot interface 106. For example, if a user in role of salesman 120 has a software engineering question, then the user may manually select the software engineer 122A vertical (e.g., by selecting a button chatbot interface labeled "software engineering"). Chatbot processor 126 may then continue to use the manually selected vertical 122 for the remainder of the session, or may automatically switch verticals 122 if confidence 128 drops below threshold 130 for one or more inputs 130.

In some embodiments, pattern identifier 132 may perform machine learning based on patterns it identifies with regard to a particular user (e.g., a single user ID 114), different users with a same or similar role 120, or across various users who are interacting with a same vertical 122A-C. These patterns may include the types of terminology being used or input 104, the types of requests for commands, information, or functionality being input 104 or being used to generate responses 110, and the types of responses 110 generated (including what tables or databases were used to generate those responses). These patterns may then be used to further optimize processing in subsequent executions of chatbot interface 106, as part of the GULP system 133.

CIS 102 may improve chatbot processing by providing and selecting one or more specialized verticals 122A-C during a single or across computing sessions for a user ID 114. These specialized verticals 122A-C may be used to increase the ability of a chatbot to quickly and correctly interpret the input 104 from a user device 108 while minimizing the processing time and increasing responsiveness. In some embodiments, different verticals 122A-C may cause different hot or frequently used data to be loaded into memory for faster processing.

For example, each vertical 122A-C may include its own keywords 124A-C, which reduces the volume of words that would otherwise needs to be searched by a generalized chatbot (which would require greater computing capacity), and allows the chatbot to increase the likelihood of correctly interpreting the input 104, because the same word in different verticals 122A-C may have different meanings. For example, a status update on a particular project may produce three different results or responses 110, depending on which vertical 122A-C is selected.

Figure 2:
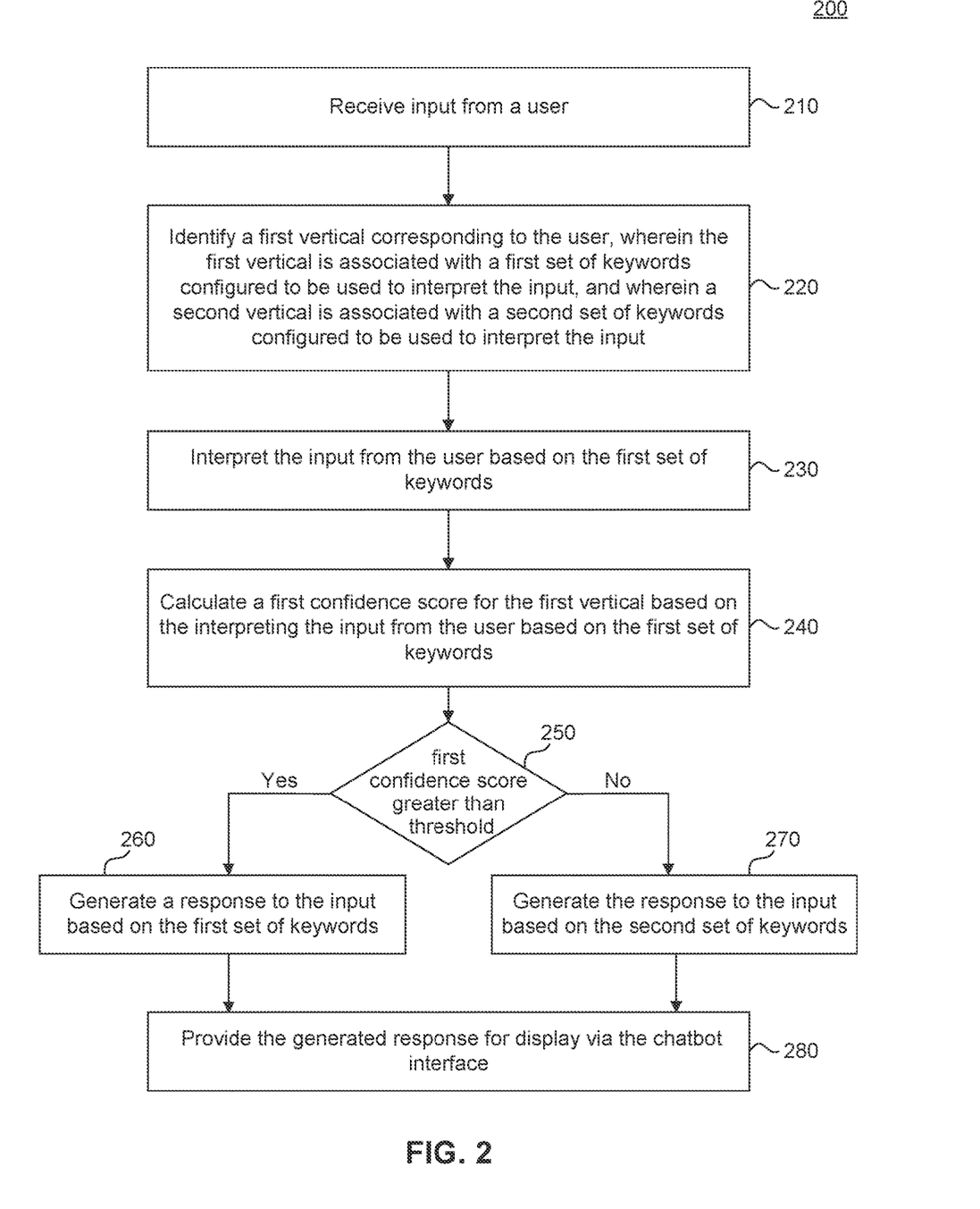
FIG. 2 is a flowchart illustrating a process for a chatbot improvement system (CIS) for providing enhanced chatbot intelligence, according to some embodiments.

FIG. 2 is a flowchart illustrating a process 200 for a chatbot improvement system (CIS) 102 for providing enhanced chatbot intelligence, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to that example embodiment.

In 210, input from a user is received. For example, CIS 102 may receive input 104 from chatbot interface 106 operating on or accessible from user device 108. In some embodiments, chatbot interface 106 may be provided by a server (or cloud environment) on which CIS 102 is executing and is accessible through an app or web browser. The input 104 may include textual or audio input (which may be converted into textual input).

In 220, a first vertical corresponding to the user is identified, wherein the first vertical is associated with a first set of keywords configured to be used to interpret the input, and wherein a second vertical is associated with a second set of keywords configured to be used to interpret the input. For example, classifier 112 may identify a user ID 114 and retrieve a user history 116 corresponding to the user ID 114. From the user history 116, classifier 112 may select a first or initial vertical 122A-C. If there is no user history 116, classifier 112 may select a default vertical 122A-C, or the most recently selected vertical (even if selected for use with a different user ID 114).

In 230, the input from the user is interpreted based on the first set of keywords. For example, chatbot processor 126 may use the keywords 124A-C of the selected vertical 122A-C to interpret input 104 and identify the intent of the input 104 or the user request or query. In some embodiments, each vertical 122A-C may have its own set of keywords 124A-C that may be used by chatbot processor 126 to interpret the input 104 and generate a response 110. By focusing on only the set of keywords 124A-C corresponding to the selected vertical 122A-C, chatbot processor 126 is able to more quickly and accurately interpret input 104 and generate response 110.

In 240, a first confidence score for the first vertical is calculated based on the interpreting the input from the user based on the first set of keywords. For example, chatbot processor 126 may calculate a score of confidence 128 based on analyzing the input 104 in view of the keywords 124A-C of the selected vertical 122A-C.

In 250, it may be determined whether the first confidence score exceeds a threshold. For example, classifier 112 may retrieve confidence 128 and compare it to threshold 130 to determine whether chatbot processor 126 should continue using the selected vertical 122A-C, or to switch to a different vertical (in real-time) to process input 104.

In 260, a response to the input is generated based on the first set of keywords if the first confidence score exceeds the threshold. For example, if confidence 128 is greater than or equal to threshold 130, then no change may be made to the selected vertical 122A-C, and chatbot processor 126 may continue processing input 104 and generating one or more responses 110 using the previously selected vertical 122A-C.

In 270, the response to the input is generated based on the second set of keywords if the first confidence score does not exceed the threshold. For example, if vertical 122A is the initially selected vertical for which the confidence 128 was less than threshold 130, chatbot processor 126 may interpret the input 104 against both keywords 124B and 124C, and classifier 112 may select the vertical 122A-C with the highest confidence 128, or may select the first vertical with confidence 128 greater than threshold 130.

In 280, the generated response is provided for display via the chatbot interface. For example, response 110 may be displayed or output (e.g., audibly) for user through chatbot interface 106. In some embodiments, response 110 may be additional questions for user requesting subsequent input, hyperlinks for the user to select, or other requested data.

Figure 3:
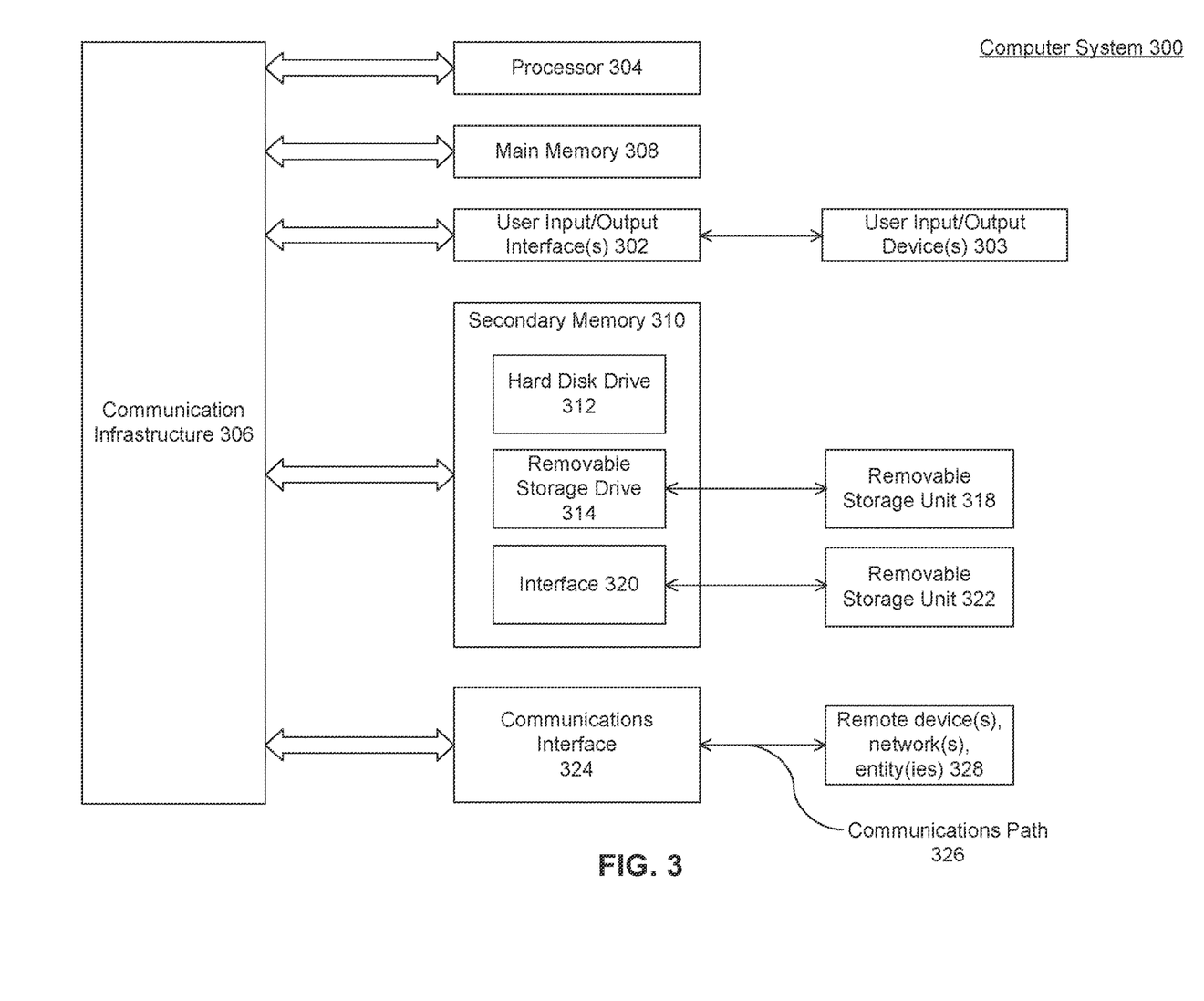
FIG. 3 illustrates an example computer system useful for implementing various embodiments.

Various embodiments and/or components therein can be implemented, for example, using one or more computer systems, such as computer system 300 shown in FIG. 3. Computer system 300 can be any computer or computing device capable of performing the functions described herein. For example, one or more computer systems 300 can be used to implement any embodiments of FIGS. 1-2, and/or any combination or sub-combination thereof.

Computer system 300 includes one or more processors (also called central processing units, or CPUs), such as a processor 304. Processor 304 is connected to a communication infrastructure or bus 306. Computer system 300 may represent or comprise one or more systems on chip (SOC).

One or more processors 304 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 can include one or more levels of cache. Main memory 308 has stored therein control logic (i.e., computer software) and/or data.

Computer system 300 can also include one or more secondary storage devices or memory 310. Secondary memory 310 can include, for example, a hard disk drive 312 and/or a removable storage device or drive 314. Removable storage drive 314 can be a floppy disk drive, a magnetic tape drive, a compact disk drive, an optical storage device, tape backup device, and/or any other storage device/drive.

Removable storage drive 314 can interact with a removable storage unit 318. Removable storage unit 318 includes a computer usable or readable storage device having stored thereon computer software (control logic) and/or data. Removable storage unit 318 can be a floppy disk, magnetic tape, compact disk, DVD, optical storage disk, memory card, and/any other computer data storage device. Removable storage drive 314 reads from and/or writes to removable storage unit 318 in a well-known manner.

According to an exemplary embodiment, secondary memory 310 can include other means, instrumentalities or other approaches for allowing computer programs and/or other instructions and/or data to be accessed by computer system 300. Such means, instrumentalities or other approaches can include, for example, a removable storage unit 322 and an interface 320. Examples of the removable storage unit 322 and the interface 320 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 can further include a communication or network interface 324. Communication interface 324 enables computer system 300 to communicate and interact with any combination of remote devices, remote networks, remote entities, etc. (individually and collectively referenced by reference number 328). For example, communication interface 324 can allow computer system 300 to communicate with remote devices 328 over communications path 326, which can be wired and/or wireless, and which can include any combination of LANs, WANs, the Internet, etc. Control logic and/or data can be transmitted to and from computer system 300 via communication path 326.

In some embodiments, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

receiving input from a user via a chatbot interface;

identifying a first vertical corresponding to the user based on a history of the user, wherein the first vertical is associated with a first set of keywords configured to be used to interpret the input, wherein a second vertical is associated with a second set of keywords configured to be used to interpret the input, wherein a plurality of previous sessions of the history include both a selection of the first vertical and a selection of the second vertical, and wherein the first vertical was selected more often than the second vertical across the plurality of previous sessions;

interpreting the input from the user based on the first set of keywords;

calculating a first confidence score for the first vertical based on the interpreting the input from the user based on the first set of keywords;

determining whether the first confidence score exceeds a threshold, wherein if the first confidence score exceeds the threshold, the method further comprises generating a response to the input based on the first set of keywords, and wherein if the first confidence score does not exceed the threshold, the method further comprises generating the response to the input based on the second set of keywords; and providing the generated response for display via the chatbot interface.

2. The method of claim 1, wherein the identifying is based on a history of the user, wherein a previous session in the history includes a selection of the first vertical for the previous session.

3. The method of claim 1, wherein if the first confidence score does not exceed the threshold, the generating the response to the input based on the second set of keywords comprises:

interpreting the input from the user based on the second set of keywords;

calculating a second confidence score for the second vertical based on the interpreting the input from the user based on the second set of keywords; and determining that the second confidence score exceeds the threshold.

4. The method of claim 1, wherein if the first confidence score does not exceed the threshold, the generating the response to the input based on the second set of keywords comprises:

interpreting the input from the user based on a third set of keywords corresponding to a third vertical;

calculating a third confidence score for the third vertical based on the interpreting the input from the user based on the third set of keywords;

determining that the third confidence score does not exceed the threshold;

interpreting the input from the user based on the second set of keywords;

calculating a second confidence score for the second vertical based on the interpreting the input from the user based on the second set of keywords; and determining that the second confidence score exceeds the threshold.

5. The method of claim 1, wherein the determining whether the first confidence score exceeds the threshold comprises:

calculating a second confidence score for an interpretation of the input based on the second set of keywords;

determining that both the first confidence score and the second confidence score exceed the threshold;

identifying a higher confidence score between the first confidence score and the second confidence score;

selecting one of the first set of keywords or the second set of keyword based on which to generate the response based the identified higher confidence score.

6. The method of claim 1, wherein the first vertical is identified as corresponding to the user based on a role of the user within an organization.

7. A system comprising at least one processor configured to perform operations comprising:

receiving input from a user via a chatbot interface;

identifying a first vertical corresponding to the user, wherein the first vertical is associated with a first set of keywords configured to be used to interpret the input, and wherein a second vertical is associated with a second set of keywords configured to be used to interpret the input;

interpreting the input from the user based on the first set of keywords;

calculating a first confidence score for the first vertical based on the interpreting the input from the user based on the first set of keywords;

determining whether the first confidence score exceeds a threshold, wherein if the first confidence score exceeds the threshold, the operations further comprise generating a response to the input based on the first set of keywords, and wherein if the first confidence score does not exceed the threshold, the operations further comprise generating the response to the input based on the second set of keywords, and wherein the generating the response to the input based on the second set of keywords comprises:

interpreting the input from the user based on the second set of keywords;

calculating a second confidence score for the second vertical based on the interpreting the input from the user based on the second set of keywords; and determining that the second confidence score exceeds the threshold; and providing the generated response for display via the chatbot interface.

8. The system of claim 7, wherein the identifying is based on a history of the user, wherein a previous session in the history includes a selection of the first vertical for the previous session.

9. The system of claim 7, wherein if the first confidence score does not exceed the threshold, the generating the response to the input based on the second set of keywords comprises:

interpreting the input from the user based on a third set of keywords corresponding to a third vertical;

calculating a third confidence score for the third vertical based on the interpreting the input from the user based on the third set of keywords;

determining that the third confidence score does not exceed the threshold;

interpreting the input from the user based on the second set of keywords;

calculating a second confidence score for the second vertical based on the interpreting the input from the user based on the second set of keywords; and determining that the second confidence score exceeds the threshold.

10. The system of claim 7, wherein the determining whether the first confidence score exceeds the threshold comprises:

calculating a second confidence score for an interpretation of the input based on the second set of keywords;

determining that both the first confidence score and the second confidence score exceed the threshold;

identifying a higher confidence score between the first confidence score and the second confidence score;

selecting one of the first set of keywords or the second set of keyword based on which to generate the response based the identified higher confidence score.

11. The system of claim 7, wherein the identifying is based on a history of the user, wherein a plurality of previous sessions of the history include both a selection of the first vertical and a selection of the second vertical; and determining that the first vertical was selected more often than the second vertical across the plurality of previous sessions.

12. The system of claim 7, wherein the first vertical is identified as corresponding to the user based on a role of the user within an organization.

13. A non-transitory computer-readable medium having instructions stored thereon that, when executed by at least one computing device, cause the at least one computing device to perform operations comprising:
receiving input from a user via a chatbot interface;
identifying a first vertical corresponding to the user, wherein the first vertical is associated with a first set of keywords configured to be used to interpret the input, wherein a second vertical is associated with a second set of keywords configured to be used to interpret the input, wherein a plurality of previous sessions of the history include both a selection of the first vertical and a selection of the second vertical, and wherein the first vertical was selected more often than the second vertical across the plurality of previous sessions;
interpreting the input from the user based on the first set of keywords;
calculating a first confidence score for the first vertical based on the interpreting the input from the user based on the first set of keywords;
determining whether the first confidence score exceeds a threshold,
wherein if the first confidence score exceeds the threshold, the operations further comprise generating a response to the input based on the first set of keywords, and
wherein if the first confidence score does not exceed the threshold, the operations further comprise generating the response to the input based on the second set of keywords; and
providing the generated response for display via the chatbot interface.

14. The non-transitory computer-readable medium of claim 13, wherein the identifying is based on a history of the user, wherein a previous session in the history includes a selection of the first vertical for the previous session.

15. The non-transitory computer-readable medium of claim 13, wherein if the first confidence score does not exceed the threshold, the generating the response to the input based on the second set of keywords comprises:
interpreting the input from the user based on the second set of keywords;
calculating a second confidence score for the second vertical based on the interpreting the input from the user based on the second set of keywords; and
determining that the second confidence score exceeds the threshold.

16. The non-transitory computer-readable medium of claim 13, wherein if the first confidence score does not exceed the threshold, the generating the response to the input based on the second set of keywords comprises:
interpreting the input from the user based on a third set of keywords corresponding to a third vertical;
calculating a third confidence score for the third vertical based on the interpreting the input from the user based on the third set of keywords;
determining that the third confidence score does not exceed the threshold;
interpreting the input from the user based on the second set of keywords;
calculating a second confidence score for the second vertical based on the interpreting the input from the user based on the second set of keywords; and
determining that the second confidence score exceeds the threshold.

17. The non-transitory computer-readable medium of claim 13, wherein the determining whether the first confidence score exceeds the threshold comprises:
calculating a second confidence score for an interpretation of the input based on the second set of keywords;
determining that both the first confidence score and the second confidence score exceed the threshold;
identifying a higher confidence score between the first confidence score and the second confidence score;
selecting one of the first set of keywords or the second set of keyword based on which to generate the response based the identified higher confidence score.

* * * * *